United States Patent
Lozano Omana et al.

(10) Patent No.: US 11,603,070 B1
(45) Date of Patent: Mar. 14, 2023

(54) VEHICLE SEAT INCLUDING MOVABLE AIRBAG

(71) Applicant: Ford Global Technologies, LLC, Dearborn, MI (US)

(72) Inventors: Fernando Lozano Omana, Cuauhtemoc/Mexico (MX); Mariana Victoria Rojas, Anzures/Mexico (MX); Dante Arturo Rodriguez Camacho, Texcoco/Estado de Mexico (MX); Jaime Cardenas, Huixquilucan/Estado de Mexico (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/502,093

(22) Filed: Oct. 15, 2021

(51) Int. Cl.
| | |
|---|---|
| *B60R 21/217* | (2011.01) |
| *B60R 21/207* | (2006.01) |
| *B60R 21/015* | (2006.01) |
| *B60R 21/231* | (2011.01) |
| *B60R 21/16* | (2006.01) |

(52) U.S. Cl.
CPC ...... *B60R 21/217* (2013.01); *B60R 21/01554* (2014.10); *B60R 21/207* (2013.01); *B60R 21/23138* (2013.01); *B60R 2021/161* (2013.01); *B60R 2021/2173* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 7,086,663 B2 | 8/2006 | Honda | |
| 7,673,937 B2 | 3/2010 | Core Almarza et al. | |
| 7,802,809 B2 | 9/2010 | Ryan et al. | |
| 9,296,353 B1 | 3/2016 | Choi | |
| 9,296,356 B2 | 3/2016 | Fujiwara | |
| 9,352,839 B2 | 5/2016 | Gehret et al. | |
| 9,434,340 B2 | 9/2016 | Egusa | |
| 9,522,617 B2 | 12/2016 | Seki et al. | |
| 11,208,070 B1 * | 12/2021 | Jaradi | B60R 21/233 |
| 11,235,728 B2 * | 2/2022 | Kobayashi | B60R 21/207 |
| 2015/0191143 A1 | 7/2015 | Faruque et al. | |
| 2019/0047503 A1 | 2/2019 | Faruque et al. | |
| 2020/0108747 A1 * | 4/2020 | Sekizuka | B60N 2/42745 |
| 2020/0307484 A1 | 10/2020 | Adler | |

FOREIGN PATENT DOCUMENTS

| | | | | |
|---|---|---|---|---|
| CN | 111319579 A * | 6/2020 | | B60R 21/207 |
| DE | 102019107365 A1 * | 9/2020 | | B60R 21/01 |
| DE | 102021131319 A1 * | 6/2022 | | B60R 21/207 |

(Continued)

*Primary Examiner* — Faye M Fleming
(74) *Attorney, Agent, or Firm* — Frank A. MacKenzie; Bejin Bieneman PLC

(57) ABSTRACT

A seat includes a seat bottom and a seatback rotatable relative to the seat bottom. The seatback is elongated upwardly from the seat bottom along a longitudinal axis of the seatback. An airbag assembly is supported by the seatback in an uninflated position. The airbag includes a housing and an airbag supported by the housing. The housing is moveably engaged with the seatback and moveable relative to the seat along a longitudinal axis of the seatback.

16 Claims, 7 Drawing Sheets

(56) References Cited

FOREIGN PATENT DOCUMENTS

| JP | 2008201297 | A |   | 9/2008 |
|----|------------|---|---|--------|
| JP | 2010269621 | A |   | 12/2010 |
| JP | 201443128  | A |   | 3/2014 |
| JP | 2014043128 | A | * | 3/2014 |
| JP | 2022077924 | A | * | 5/2022 |
| KR | 1020080099710 | A |   | 11/2008 |
| KR | 20220072970 | A | * | 6/2022 |

* cited by examiner

VEHICLE SEAT INCLUDING MOVABLE AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions. The seats may be rotatable to a reclined position.

DETAILED DESCRIPTION

Figure 1:
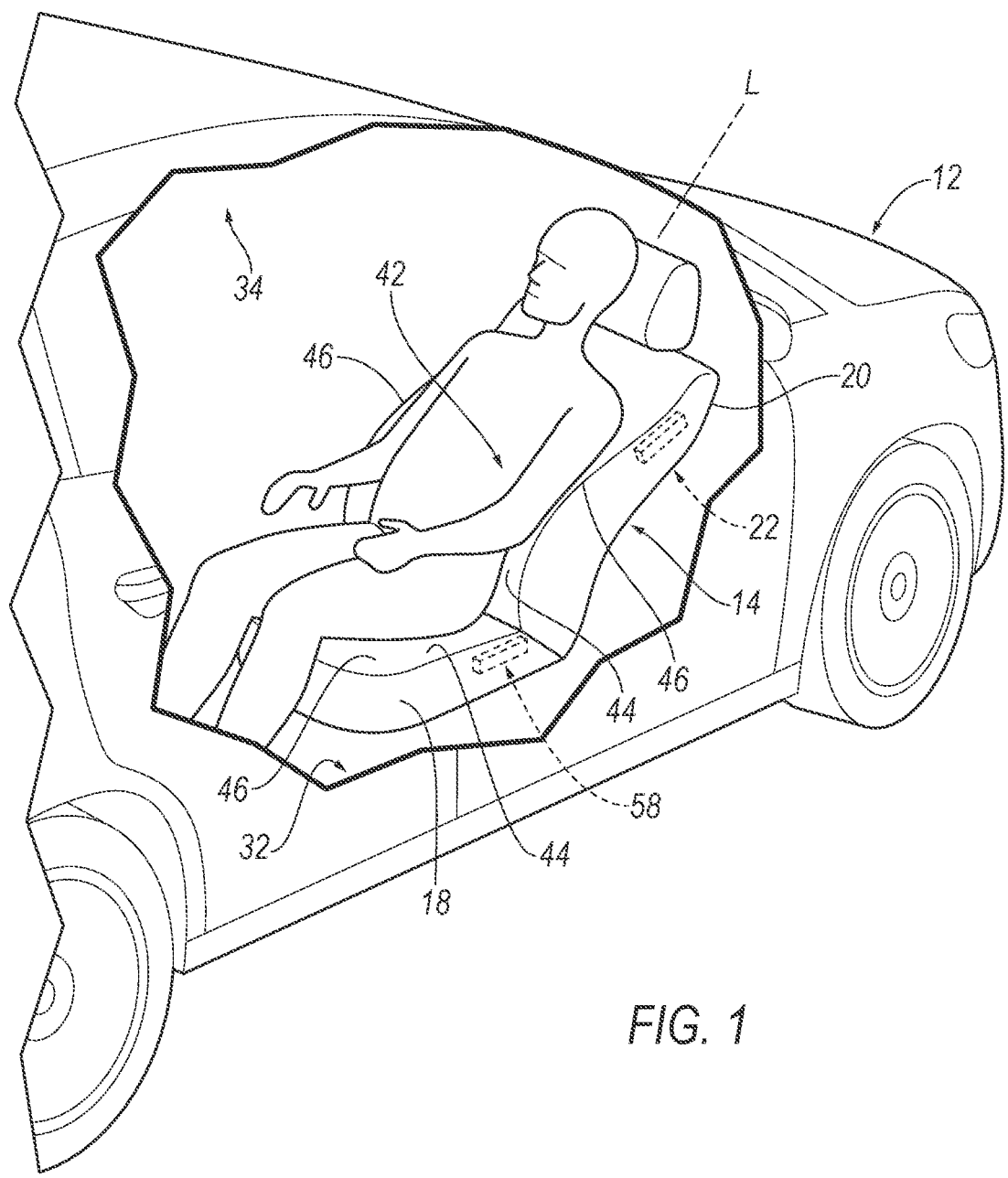
FIG. 1 is a cut-away view of a vehicle with a vehicle in a rearward-facing position and in a reclined position.

With reference to the Figures, wherein like numerals indicate like parts throughout the several views, an assembly 10 for a vehicle 12 is generally shown. The assembly 10 includes a seat 14 having a seat bottom 18 and a seatback 20 rotatable relative to the seat bottom 18. The seatback 20 is elongated upwardly from the seat bottom 18 along a longitudinal axis L of the seatback 20. A first airbag assembly 22 is supported by the seatback 20 in an uninflated position. The first airbag assembly 22 includes a housing 28 and a first airbag 26 supported by the housing 28. The housing 28 is moveably engaged with the seatback 20 and is moveable relative to the seatback 20 along the longitudinal axis L of the seatback 20.

Since the housing 28 is moveably engaged with the seatback 20 and moveable relative to the seatback 20 along the longitudinal axis L, the position of the housing 28, and thus the position of the first airbag 26, may be adjusted relative to the seatback 20. Specifically, the position of the housing 28 relative to the seatback 20 may be adjusted based on a recline position of the seatback 20 relative to the seat bottom 18, as described further below. The seatback 20 may be adjusted between an upright position (FIGS. 2-3) and a reclined position (FIGS. 4-5) and the housing 28 may be moved relative to the seatback 20 when the seatback 20 is adjusted from an upright position to a reclined position and when the seatback 20 is adjusted from a reclined position to an upright position. In some examples, the seat 14 may be rearward facing. For example, the seat 14 may be rotatable relative to the rest of the vehicle 12 between a forward-facing position and a rearward-facing position. In examples in which the seat 14 is in a rearward-facing position and is in a reclined position, the housing 28 may be moved relative to the seatback 20 to a position that controls the kinematics of the occupant during a vehicle impact, e.g., a vehicle-side impact. In such an example, the airbag may be operable in conjunction with or in the alternative to other airbags in the vehicle 12, e.g., a side-curtain airbag.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from the driver, i.e., the vehicle 12 may be self-driving without human input.

The vehicle 12 includes a vehicle frame and the vehicle body. The vehicle frame and the vehicle body may be of a unibody construction in which the frame is unitary with a vehicle body (including frame rails, pillars, roof 34 rails, rockers, etc.). As another example, the vehicle body and vehicle frame may have a body-on-frame construction (also referred to as a cab-on-frame construction) in which the vehicle body and frame are separate components, i.e., are modular, and the vehicle body is supported on and affixed to the frame. Alternatively, the vehicle frame and vehicle body may have any suitable construction. The vehicle frame and vehicle body (e.g., frame rails, pillars, roof 34 rails, rockers, etc.) may be of any suitable material, for example, steel, aluminum, and/or fiber-reinforced plastic, etc.

The vehicle body may define a passenger compartment to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body includes, for example, rockers, roof 34 rails, pillars, body panels, a vehicle floor 32, a vehicle roof 34, etc. The vehicle floor 32 is spaced downwardly from the vehicle roof 34. The vehicle floor 32 may define the lower boundary of the passenger compartment and the roof 34 may define the upper boundary of the passenger compartment. The vehicle floor 32 and the vehicle roof 34 may both extend from the front end of the passenger compartment to the rear end of the passenger compartment and from one side of the vehicle 12 to the other side of the vehicle 12. The vehicle floor 32 and the vehicle roof 34 may both include a metal panel and upholstery exposed to the passenger compartment.

With continued reference to FIG. 1, the vehicle 12 includes at least one seat 14. One seat 14 is shown in FIGS. 1-5 to illustrate details of the seat 14 and the vehicle 12 may include any suitable number of seats 14, i.e., one or more. In examples including more than one seat 14, the seats 14 may be arranged in any suitable arrangement in the passenger compartment. For example, one or more of the seats 14 may be at the front end of the passenger cabin, e.g., a driver seat 14 and/or a passenger seat 14, and/or one or more of the seats 14 may be at the rear end of the passenger cabin, i.e., a rear seat 14. The seat 14 may include the first airbag 26 and a second airbag 60, as described further below. In examples include a plurality of seats 14, one or more of the seats 14 may include the first airbag 26 and the second airbag 60.

The seat 14 includes the seatback 20 and a seat bottom 18. The seatback 20 may be supported by the seat bottom 18 and is movable relative to the seat bottom 18 to various recline positions. Specifically, the seatback 20 may be rotatable relative to the seat bottom 18 to at least one upright position and at least one reclined position. In an upright position, the seatback 20 is positioned such that an occupant is seated their torso elongated upright and in a reclined position, the seatback 20 is positioned such that an occupant is prone. As an example, the seatback 20 is in an upright position when between 90-135 degrees relative to the seat bottom 18 and is in a reclined position when between 135-180 degrees relative to the seat bottom 18. The seatback 20 may be hingedly connected to the seat bottom 18 at a hinge between the seatback 20 and the seat bottom 18. The hinge may be of a type as is known in the art. The seatback 20 may be moved relative to the seat bottom 18 to various recline positions by motorized movement and/or manual movement, i.e., movement based mechanical input by an occupant on a lever, knob, etc. For example, the seat 14 may include a seat-recline motor 36 (FIG. 6) between the seatback 20 and the seat bottom 18. In such an example, the seat-recline motor 36 rotates the seatback 20 relative to the seat bottom 18 about the hinge. The seat-recline motor 36 may be controlled by the controller 72, as described further below.

The seat 14 may include a frame, e.g., a seatback frame 38 and a seat bottom frame 40, and a covering supported on the frame. The frame of the seat 14 may include tubes, beams, etc. Specifically, the seatback frame 38 may include a pair of upright frame members. The upright frame members are elongated, and specifically, are elongated in a generally upright direction when the seatback 20 is in a generally upright position. The upright frame members are spaced from each other and the seatback frame 38 includes cross-members (not shown) extending between the upright frame members. The seatback frame 38, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame 38 may be formed of a suitable metal, e.g., steel, aluminum, etc.

The covering may include upholstery and padding. The upholstery may be cloth, leather, faux leather, or any other suitable material. The upholstery may be stitched in panels around the frame. The padding may be between the covering and the seatback frame 38 and may be foam or any other suitable material. The covering may include a tear seam through which the airbags may extend when the airbags are inflated.

The seat 14 defines an occupant-seating area 42. Specifically, the seatback 20 and the seat bottom 18 each have occupant-seating surfaces 44 that define the occupant-seating area 42. When an occupant is properly seated in the seat 14, the occupant is in the occupant-seating area 42 with the back of the torso of the occupant adjacent the occupant-seating surface 44 of the seatback 20 and the back of the thighs of the occupant adjacent the occupant-seating surface 44 of the seat bottom 18. The first airbag 26 in the inflated position extends from the seatback 20 adjacent the occupant-seating area 42, i.e., adjacent the occupant-seating surface 44 of the seatback 20. Specifically, the seatback 20 may include two bolsters 46 spaced from each other in a cross-seat direction the occupant-seating surface 44 extends from one of the bolsters 46 to the other of the bolsters 46. In such an example, the first airbag 26 extends from one of the bolsters 46 of the seat 14 back in the inflated position. The seat bottom 18 may include two bolsters 46 spaced from each other in a cross-seat direction and the occupant-seating area 42 is between the two bolsters 46 of the seat bottom 18. In such an example, the second airbag 60 extends from one of the bolsters 46 of the seat bottom 18 in the inflated position.

The seat 14 may be rotatable. Specifically, the seat 14 may be rotatable about an axis R that extends through the roof 34 and the floor 32. For example, the seat 14 is rotatable between one or more forward-facing positions, one or more rearward-facing positions, and/or positions therebetween, e.g., a rightward-facing position, leftward-facing position, etc. The seat 14 may rotate completely, i.e., 360°, about the axis R. The seat 14 may rotate between fixed positions, e.g., the forward-facing position and the rearward-facing position, or may be rotatable to an infinite number of positions. In a forward-facing position, an occupant of the seat 14 faces vehicle-forward, e.g., faces a front windshield and front instrument panel. In a rearward-facing position, an occupant of the seat 14 faces vehicle-rearward, e.g., faces a rear window of the vehicle 12 the front dash. Specifically, the forward-facing position includes a position of the seat 14 such that the occupant-seating surface 44 of the seatback 20 faces vehicle-forward and is perpendicular to a vehicle longitudinal axis L and, in examples in which the seat 14 is rotatable to more than one forward-facing position, the forward-facing positions include the position of the seat 14 such that the occupant-seating surface 44 of the seatback 20 faces vehicle-forward and is perpendicular to a vehicle longitudinal axis L and rotation from that position +/−45 degrees about the axis. The rearward-facing position includes a position of the seat 14 such that the occupant-seating surface 44 of the seatback 20 faces vehicle-rearward and is perpendicular to the vehicle longitudinal axis L and, in examples in which the seat 14 is rotatable to more than one rearward-facing position, the rearward-facing positions include the position of the seat 14 such that the occupant-seating surface 44 of the seatback 20 faces vehicle-rearward and is perpendicular to a vehicle longitudinal axis L and rotation from that position +/−45 degrees about the axis R.

The seat 14 may include any suitable components for rotation about the axis R. For example, the seat 14 may include a seat-rotation motor 48 (FIG. 6) fixed to the floor 32 and configured to rotate the seat 14 relative to the floor 32. Gears may be disposed between the seat-rotation motor 48 and the rest of the seat 14.

The vehicle 12 includes a seat-rotation sensor 50 (FIG. 6) that detects the facing position of the seat 14, e.g., that detects the position of the seat 14 in a forward-facing position and/or a rearward-facing position. The seat-rotation sensor 50 may be, for example, a contact sensor that is triggered when the seat 14 is in a forward-facing position and/or a rearward-facing position, a rotary encoder on the seat-rotation motor 48, an image sensor in passenger compartment that detects the rotational position of the seat 14 based on image comparison and/or image recognition, or any other suitable type of sensor that detects the rotational position of the seat 14.

The assembly 10 includes a recline-position sensor 52 configured to detect the recline position of the seatback 20 relative to the seat bottom 18. The recline-position sensor 52 may be in communication with the controller 72 of the vehicle 12, as described further below. Specifically, the recline-position sensor 52 is configured to detect that the seatback 20 is in an upright position and/or to detect that the seatback 20 is in a reclined position. The recline-position sensor 52 may be, for example, on the seat 14 between the seatback 20 and the seat bottom 18. In such an example, the recline-position sensor 52 is configured to detect the rotational position of the seatback 20 relative to the seat bottom 18. Specifically, the recline-position sensor 52 detects relative rotation and/or relative rotational position of the seatback 20 relative to the seat bottom 18, e.g., based on position of a rotary encoder on the seat-recline motor 36, image detection, Hall-effect sensor, etc., to identify that the seatback 20 is in an upright position and/or to detect that the seatback 20 is in a reclined position.

In the example shown in the Figures, the recline-position sensor 52 is binary. For example, the recline-position sensor 52 may include a switch 56 fixed to the seat 14, e.g., the seat bottom 18 or the seatback 20, that is opened or closed as the seatback 20 moves from an upright position to a reclined position. In the example shown in the Figures, the recline-position sensor 52 includes a cam 54 fixed to one of the seatback 20 and the seat bottom 18 and the switch 56 fixed to the other of the seatback 20 and the seat bottom 18 (in the example shown in the Figures, the cam 54 is fixed to the seatback 20 and the switch 56 is fixed to the seat bottom 18). The cam 54 and the switch 56 are positioned such that cam 54 opens or closes the switch 56 when the seatback 20 moves from an upright position to a reclined position. In the example shown in the Figures, the cam 54 opens the switch 56 when the seatback 20 moves from a reclined position to an upright position and closes the switch 56 when the seatback 20 moves from an upright position to a reclined position.

As other examples, the recline-position sensor 52 may be remote from the seat 14. For example, the recline-position sensor 52 may be an image sensor, e.g., mounted in the passenger compartment spaced from the seat 14, that detects the recline position of the seatback 20 based on image comparison and/or image recognition. In any event, the recline-position sensor 52 may be binary, as described above, or may take continuous measurements of the recline angle of the seatback 20 and determination of the seatback 20 as being in a reclined position or an upright position may be based on comparison of the measurement relative to a threshold that separates reclined positions from upright positions.

The vehicle 12, specifically the seat 14, includes the airbag assembly 10 including the airbag and the housing 28. In the example shown in the Figures, the seat 14 includes a second airbag assembly 58 including the second airbag 60 and a housing 28. In such an example, the first airbag assembly 22 is supported by the seatback 20, e.g., in the bolster 46 of the seatback 20, and the second airbag assembly 58 is supported by the seat bottom 18, e.g., in the bolster 46 of the seat bottom 18. The first airbag assembly 22 is moveably engaged with the seatback 20 as described further below and the second airbag assembly 58 is fixed to the seat bottom 18, e.g., the housing 28 of the second airbag assembly 58 may be fastened to the seat bottom frame 40. The first airbag assembly 22 and the second airbag assembly 58 may be in the bolsters 46 on the vehicle 12-outboard side of the seat 14, i.e., between the occupant seating area and vehicle 12 door adjacent the seat 14, when the seat 14 is in a rearward-facing position, as shown in the Figures. The first airbag 26 may be referred to as a side airbag and the second airbag may be referred to as a pelvic airbag.

The housing 28 houses the airbag in the uninflated position and supports the respective airbag 26, 60 in the inflated position. The airbag 26, 60 may be rolled and/or folded to fit within the housing 28 in the uninflated position. The housing 28 may be of any suitable material, e.g., a rigid polymer, a metal, a composite, or a combination of rigid materials.

The first airbag assembly 22 and the second airbag assembly 58 may each include an inflator 62 is in fluid communication with the respective airbag 26, 60. The inflator 62 expands the airbag 26, 60 with inflation medium, such as a gas, to move the airbag from the uninflated position to the inflated position. The inflator 62 may be supported by any suitable component. For example, the inflator 62 may be supported by the housing 28. The inflator 62 may be, for example, a pyrotechnic inflator 62 that ignites a chemical reaction to generate the inflation medium, a stored gas inflator 62 that releases (e.g., by a pyrotechnic valve) stored gas as the inflation medium, or a hybrid. The inflator 62 may be, for example, at least partially in the inflation chamber to deliver inflation medium directly to the inflation chamber or may be connected to the inflation chamber through fill tubes, diffusers, etc.

With reference to FIGS. 2-5, the first airbag assembly 22 is moveable relative to the seatback 20 along the longitudinal axis L of seatback 20. Specifically, the housing 28 of the first airbag assembly 22 is moveable relative to the seatback 20 along the longitudinal axis L of the seatback 20 when the first airbag 26 is in the uninflated position. As an example, as shown in the Figures, the assembly 10 includes a linear actuator 64 between the seatback 20 and the housing 28 of the first airbag assembly 22. The linear actuator 64 is configured to move the housing 28 relative to the seatback 20 along the longitudinal axis L of the seatback 20. In the example shown in the Figures, the linear actuator 64 is fixed to the seatback frame 38 and the housing 28 of the first airbag assembly 22 is supported on the linear actuator 64, as described further below.

Figure 2:
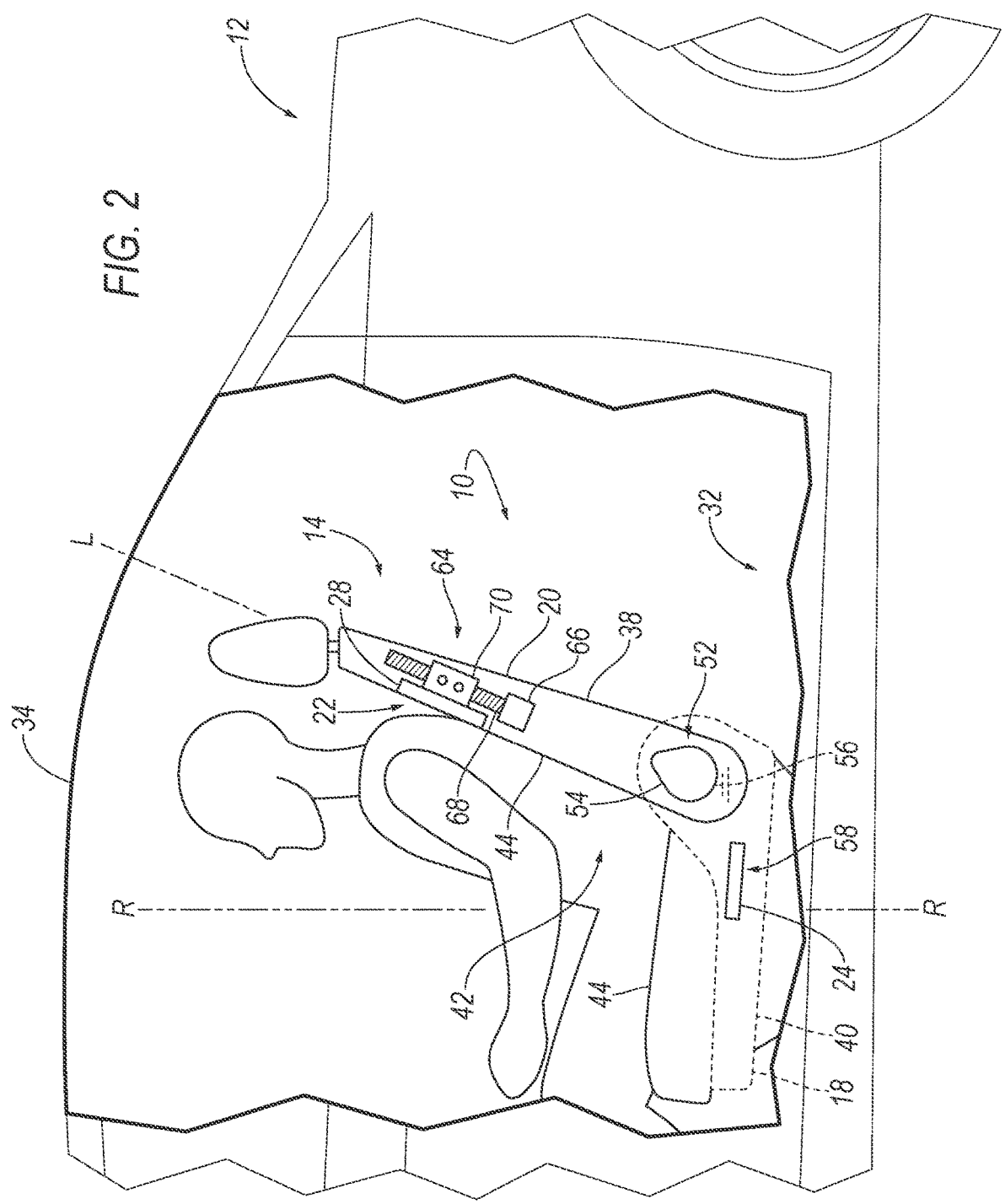
FIG. 2 is a side view of the vehicle including a seat having a seatback (shown without upholstery for illustrative purposes) in an upright position and a first airbag and a second airbag both in an uninflated position.
Figure 3:
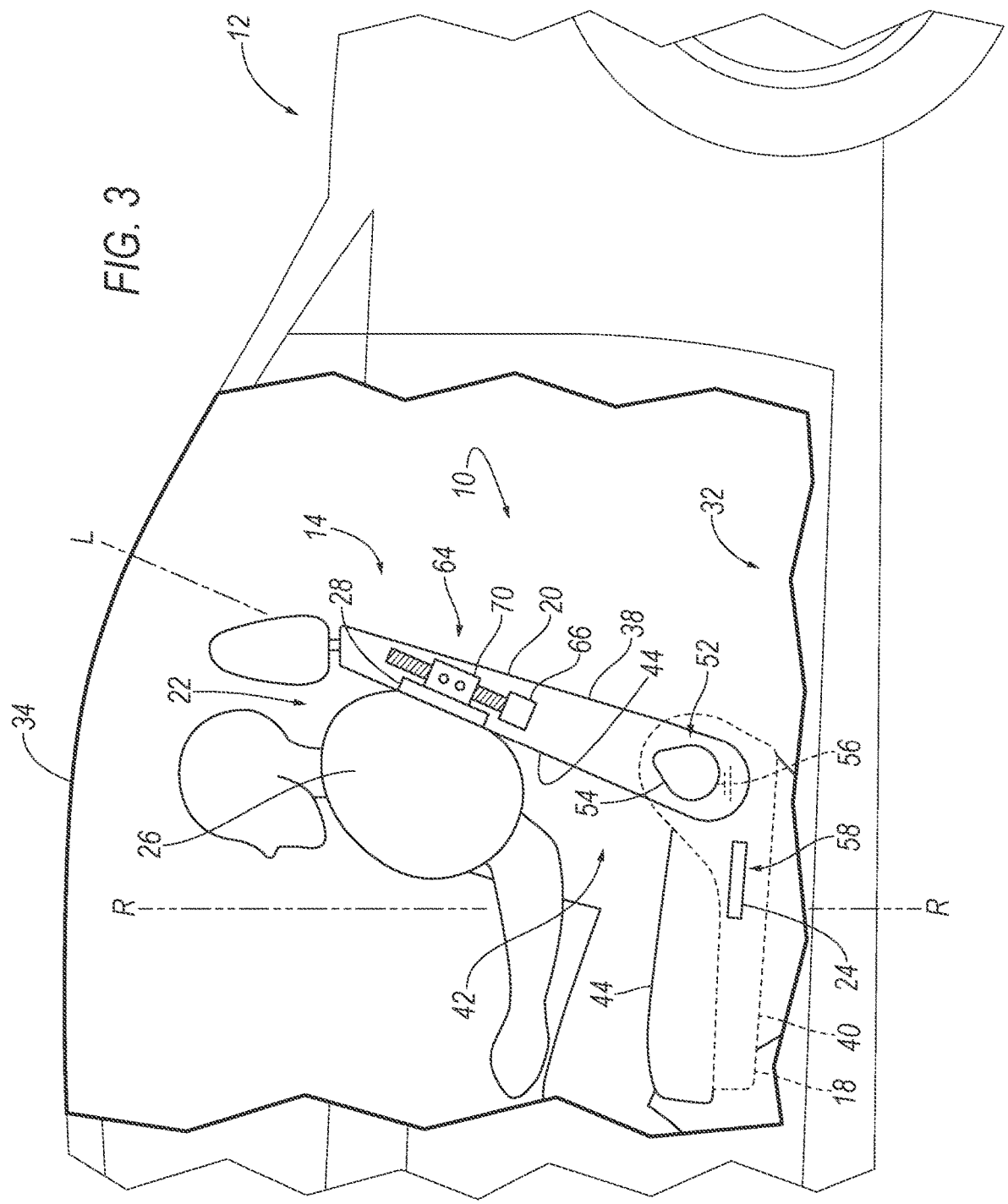
FIG. 3 is a side view of the vehicle including the seatback in an upright position and the first airbag in the inflated position and the second airbag in the uninflated position.
Figure 4:
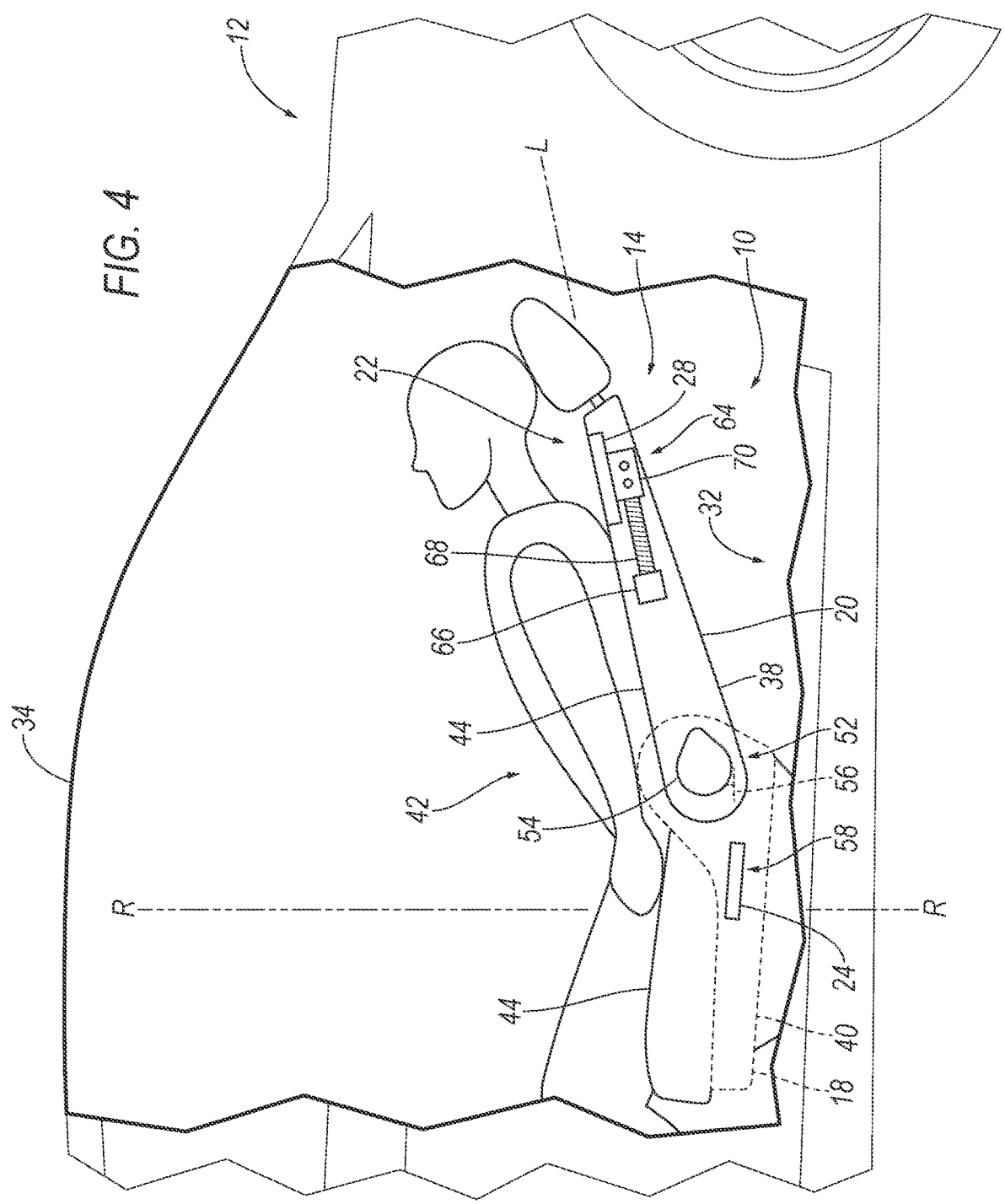
FIG. 4 is a side view of the vehicle including the seatback in a reclined position and both the first airbag and the second airbag in the uninflated position.
Figure 5:
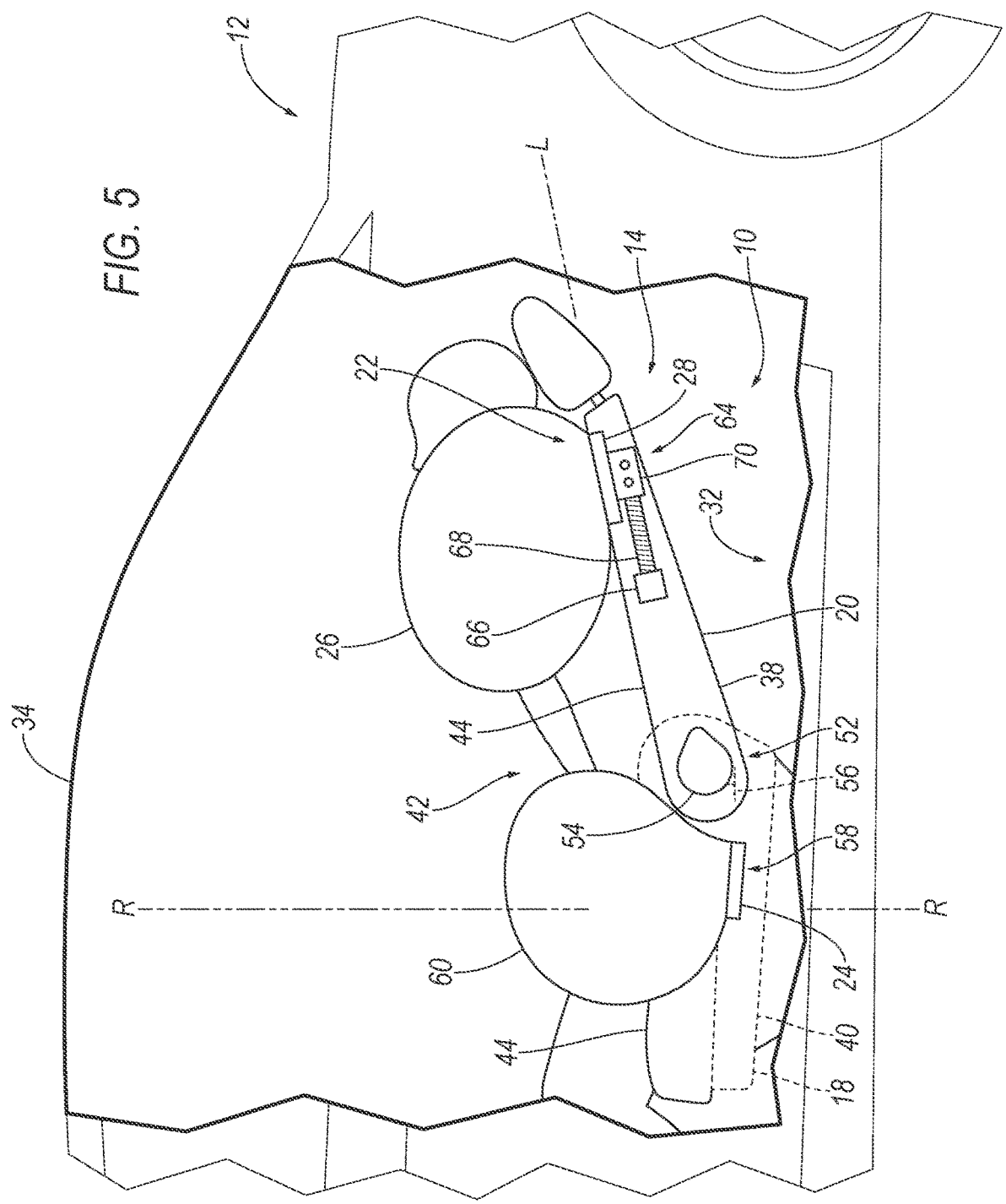
FIG. 5 is a side view of the vehicle including the seat in a reclined position and both the first airbag and the second airbag in the inflated position.

With reference to FIGS. 2-5, the linear actuator 64 may include a motor 66 mounted to the seatback 20, e.g., fastened to the seatback frame 38, and a lead screw 68 operatively engaged with the motor 66 to be rotated by the motor 66, and a carriage 70 operatively engaged with the lead screw 68 to translate along the lead screw 68 in response to rotation of the lead screw 68. The lead screw 68 may be supported by the motor 66 and engages the motor 66 such that the motor 66 rotates the lead screw 68. In such an example, the lead screw 68 is elongated along the longitudinal axis L. As described below, the motor 66 is controlled by the controller 72. The carriage 70 is threadedly engaged with the lead screw 68 such that rotation of the lead screw 68 translates the carriage 70 along the lead screw 68. Specifically, the carriage 70 includes a threaded hole (not numbered) with threads (not numbered) that match threads on the lead screw 68 such that rotation of the lead screw 68 linearly moves the carriage 70 along the lead screw 68. As shown in FIGS. 2-3, the motor 66 positions the first airbag assembly 22, specifically the motor 66 positions the carriage 70 upon which the first airbag assembly 22 is supported, to the downward position when the seatback 20 is in an upright position. As shown in FIGS. 4-5, the motor positions the first airbag assembly 22 to the downward position when the seatback 20 is in a reclined position. The motor 66 may be, for example, electrically powered by a battery of the vehicle 12 and controlled by the controller 72. The motor 66 may be of any suitable type to rotate the lead screw 68.

The first airbag assembly 22 is positioned to inflate adjacent the torso of the occupant. In the downward position, as shown in FIGS. 2-3, the first airbag assembly 22 is in position to control the kinematics of the occupant seated in an upright position. In the upward position, as shown in FIGS. 4-5, the first airbag assembly 22 is in position to control the kinematics of the occupant seated in a reclined position.

The second airbag assembly 58 is fixed to the seat bottom 18 in the uninflated position. Specifically, the housing 28 of the second airbag assembly 58 is fixed to the seat bottom 18. The second airbag assembly 58 is positioned to inflate adjacent the thighs of the occupant. Specifically, the second airbag assembly 58 is inflatable in response to vehicle impact and detection that the seatback 20 is in a reclined position, as described below. In such an example, the second airbag assembly 58 may be inflatable when the seat 14 is rotated to any position. As another example, the second airbag assembly 58 in inflatable in response to a vehicle impact and detection of both the seatback 20 in a reclined position and the seat 14 in a rearward-facing position. The inflation of the second airbag assembly 58 is controlled by the controller 72, as described below.

As shown in FIGS. 2-3, the first airbag assembly 22 is inflated in response to a vehicle impact and detection of the seatback 20 in an upright position and detection of the seat 14 in a rearward-facing position to control the kinematics of the occupant. For example, the first airbag assembly 22 in the downward position may eliminate the need for a side curtain airbag in the area of the first airbag 26 shown in FIGS. 2-3 or may be positioned to cooperate with a side curtain airbag. In such an example, the second airbag assembly 58 is not inflated. As shown in FIGS. 4-5, the first airbag assembly 22 and the second airbag assembly 58 are both inflated in response to a vehicle impact and detection of the seatback 20 in a reclined position and detection of the seat 14 in a rearward-facing position to control the kinematics of the occupant. For example, the first airbag assembly 22 in the upward position and the second airbag assembly 58 may eliminate the need for a side curtain airbag in the area of the first airbag 26 and the second airbag 60 shown in FIGS. 2-3 or may be positioned to cooperate with a side curtain airbag.

The controller 72 controls the operation of the assembly 10, i.e., position of the first airbag assembly 22 and inflation of the first airbag assembly 22 and the second airbag assembly 58. The controller 72 may also be referred to as a computer, as referenced below. The controller 72, for example, may be a restraints control module. Use of "in response to," "based on," and "upon determining" herein, including with reference to the controller 72 and methods performed by the controller 72, indicates a causal relationship, not merely a temporal relationship.

The controller 72, i.e., the computer, includes a processor and a memory. The memory includes one or more forms of computer readable media, and stores instructions executable by the processor for performing various operations, including as disclosed herein. For example, the computer can be a generic computer with a processor and memory as described above and/or may include an electronic control unit ECU or controller 72 for a specific function or set of functions, and/or a dedicated electronic circuit including an ASIC that is manufactured for a particular operation, e.g., an ASIC for processing sensor data and/or communicating the sensor data. In another example, the computer 74 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the computer, and the computer can retrieve information stored by the memory via a network in the vehicle 12 12, e.g., over a CAN bus, a wireless network, etc. Alternatively or additionally, the memory can be part of the computer, e.g., as a memory of the computer.

Figure 6:
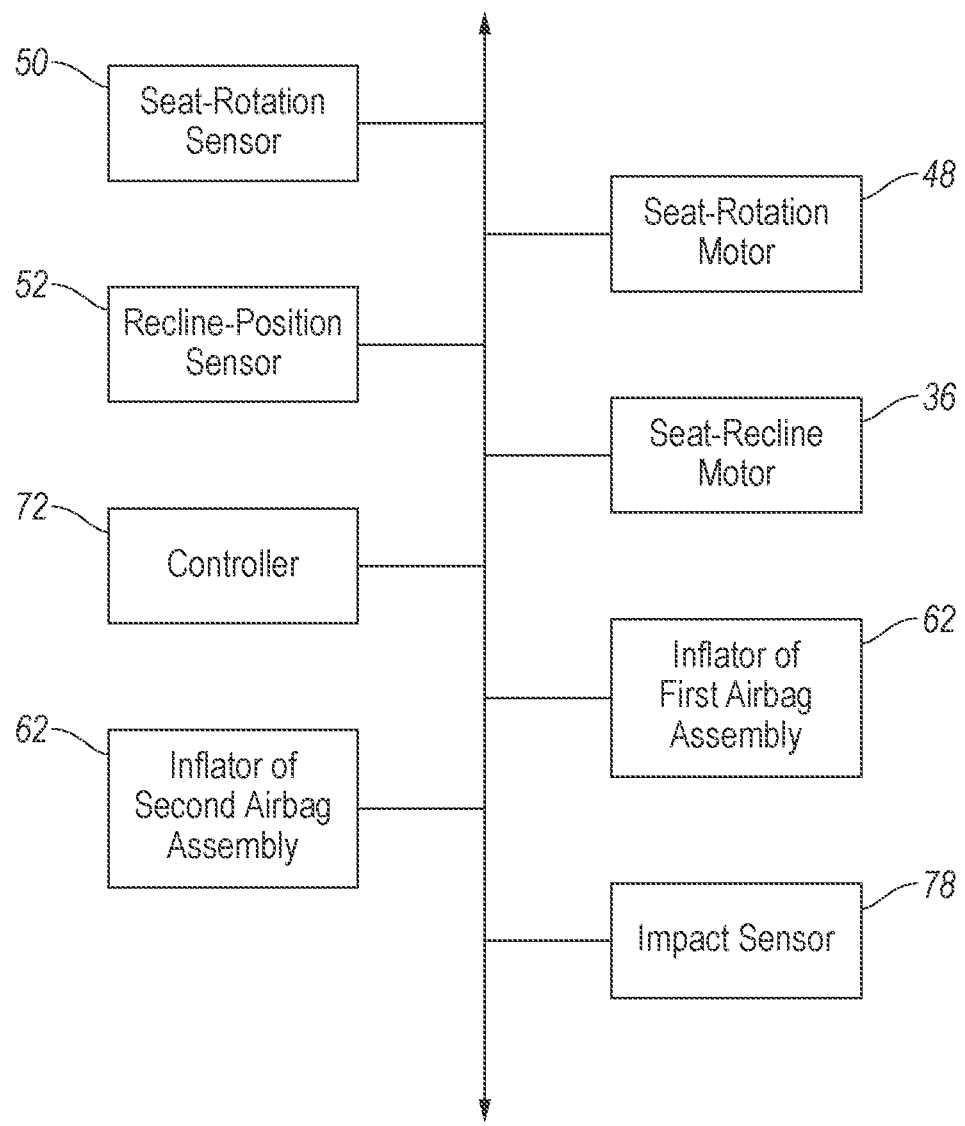
FIG. 6 is a block diagram of a vehicle communication network of the vehicle.

The controller 72 may include or be communicatively coupled to components of the vehicle 12, for example, by a vehicle network such as a communications bus. As shown in FIG. 6, the computer is generally arranged for communications on a vehicle communication network 74 that can include a bus in the vehicle 12 such as a controller 72 area network CAN or the like, and/or other wired and/or wireless mechanisms. Alternatively or additionally, in cases where the computer includes a plurality of devices, the vehicle communication network 74 may be used for communications between devices represented as the computer in this disclosure. Various controllers and/or sensors may provide data to the computer via the vehicle communication network 74. As shown in FIG. 6, the controller 72, the seat-rotation sensor 50, the seat-rotation motor 48, the recline-position sensor 76, the seat-recline motor 36, the inflators 62 and impact sensors 78 may be in communication with each other through the communications network.

The vehicle 12 may include at least one impact sensor 78 for sensing impact of the vehicle 12, and the computer in communication with the impact sensor 78. Alternatively or additionally to sensing impact, the impact sensor 78 may be configured to sense impact prior to impact, i.e., pre-impact sensing. The impact sensor 78 is configured to detect an impact to the vehicle 12. The impact sensor 78 may be of any suitable type, for example, post contact sensors such as accelerometers, pressure sensors, and contact switches; and pre impact sensors 78 such as radar, LIDAR, and vision sensing systems. The vision sensing systems may include one or more cameras, CCD image sensors, CMOS image sensors, etc. The impact sensor 78 may be located at numerous points in or on the vehicle 12.

Figure 7:
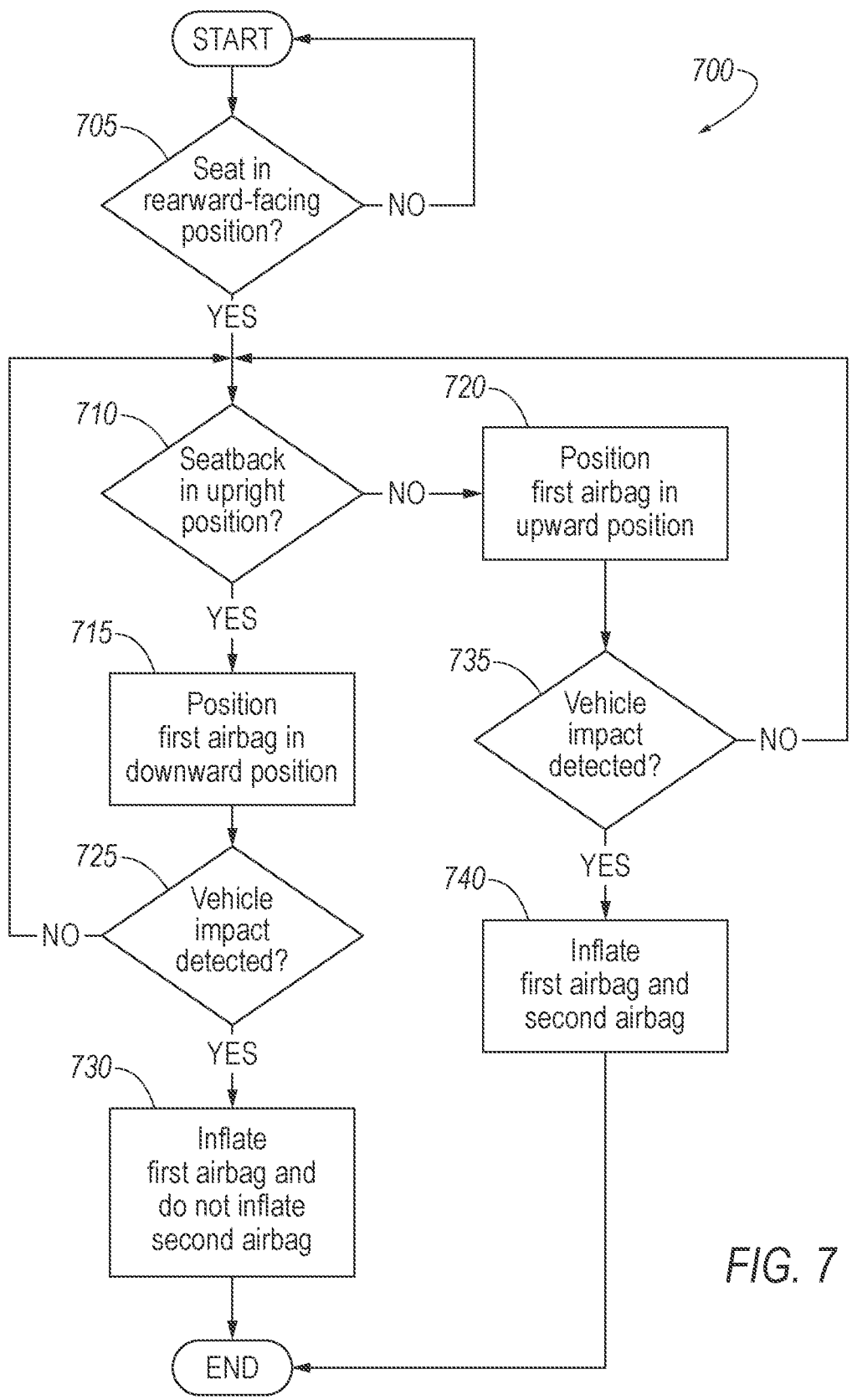
FIG. 7 is a flow chart of a method for moving the side airbag based on a recline position of the seat and inflating the side airbag and the pelvic airbag.

The controller 72 is programmed to perform the method 700 shown in FIG. 7, i.e., includes memory that store instructions executable by the processor to perform the method 700. "Programmed to perform" as used below includes, as an example, memory that stores instructions executable by the processor.

With reference to decision block 705, the method 700 may include determining if the seat 14 is in a rearward-facing position and/or determining if the seat 14 is in a forward-facing position. In some examples, including the example shown in the Figures, the method restarts if the seat 14 is forward facing. If the seat 14 is rearward facing, the method proceeds to decision block 710.

The method 700 includes determining that the seatback 20 is in an upright position and/or determining if the seatback 20 is in a reclined position, as shown in decision block 710. The determination of the recline position of the seatback 20 may be based on detection by the recline-position sensor 76. The recline-position sensor 76 may communicate the determination to the controller 72, as described above, e.g., through the communication network 74.

The controller 72 is programmed to move the housing 28 of the airbag assembly 10 along the longitudinal axis L of the seatback 20 based on a recline position of the seatback 20 relative to the seat bottom 18. The controller 72 is programmed to move the housing 28 of the airbag assembly 10 to an upward position along the longitudinal axis L of the seatback 20 when the seatback 20 is in a reclined position and to move the housing 28 of the airbag assembly 10 to a downward position along the longitudinal axis L of the seatback 20 when the seatback 20 is in an upright position. Specifically, if the seatback 20 is in an upright position, the controller 72 moves the housing 28 to the downward position, as shown in block 715. If the seatback 20 is in a reclined position, the controller 72 moves the housing 28 to the upward position, as shown in block 720. As an example shown in the Figures, the controller 72 is programmed to instruct the linear actuator 64 to move the housing 28 of the airbag assembly 10 along the longitudinal axis L of the seatback 20 based on the recline position of the seatback 20 relative to the seat bottom 18. Specifically, the controller 72 may provide instructions to the linear actuator 64 through the communications network. The controller 72 instructs the linear actuator 64 to rotate the motor to rotate the lead screw 68 and translate the carriage 70.

The controller 72 is programmed to inflate the first airbag 26, as shown in block 726, in response to a detected vehicle impact, as shown in decision block 725. Specifically, the controller 72 may be programmed to inflate the first airbag 26 in response to a determination that the seat 14 is in a rearward-facing position, the seatback 20 is in an upright position, and a vehicle impact is detected, e.g., a vehicle-side impact. In this instance, the second airbag 60 is not inflated. Specifically, the controller 72 is programmed to maintain the second airbag 60 in an uninflated position in response to detection of a vehicle impact when the seatback 20 is in an upright position.

The controller 72 being programmed to inflate the second airbag 60, as shown in block 740, in response to detection of a vehicle impact, as shown in block 735, when the seatback 20 is in a reclined position. Specifically, the controller 72 may be programmed to inflate the first airbag 26 and the second airbag 60 in response to a determination that the seat 14 is in a rearward-facing position, the seatback 20 is in a reclined position, and a vehicle impact is detected, e.g., a vehicle-side impact.

The controller 72 inflates the first airbag 26 by communication with the inflator 62 of the first airbag 26 through the communication network 74 and the controller 72 inflates the second airbag 60 by communication with the inflator 62 of the second airbag 60 through the communication network 74. For example, the controller 72 instructs the inflator 62 to ignite to release inflation medium to the respective airbag 26, 60.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
    a seat bottom and a seatback rotatable relative to the seat bottom, the seatback being elongated upwardly from the seat bottom along a longitudinal axis of the seatback; and
    an airbag assembly supported by the seatback in an uninflated position, the airbag assembly including a housing and an airbag supported by the housing, the housing being moveably engaged with the seatback and moveable relative to the seatback along the longitudinal axis of the seatback.

2. The assembly as set forth in claim 1, further comprising a linear actuator between the seatback and the housing of the airbag assembly.

3. The assembly as set forth in claim 1, further comprising a motor mounted to the seatback, a lead screw operatively engaged with the motor, and a carriage fixed to the housing of the airbag assembly and operatively engaged with the lead screw.

4. The assembly as set forth in claim 1, further comprising a controller programmed to move the housing of the airbag assembly along the longitudinal axis of the seatback based on a recline position of the seatback relative to the seat bottom.

5. The assembly as set forth in claim 4, further comprising a sensor configured to detect the recline position of the seatback relative to the seat bottom.

6. The assembly as set forth in claim 5, wherein the sensor includes a switch configured to detect the recline position of the seatback relative to the seat bottom.

7. The assembly as set forth in claim 4, further comprising a linear actuator between the seatback and the housing of the airbag assembly, the controller being programmed to instruct the linear actuator to move the housing of the airbag assembly along the longitudinal axis of the seatback based on the recline position of the seatback relative to the seat bottom.

8. The assembly as set forth in claim 4, wherein the controller is programmed to move the housing of the airbag assembly to an upward position along the longitudinal axis of the seatback when the seatback is in a reclined position and to move the housing of the airbag assembly to a downward position along the longitudinal axis of the seatback when the seatback is in an upright position.

9. The assembly as set forth in claim 4, wherein the controller is programmed to inflate the airbag in response to a detected vehicle impact.

10. The assembly as set forth in claim 9, further comprising a second airbag supported by the seat bottom, the controller being programmed to inflate the second airbag in response to detection of a vehicle impact when the seatback is in a reclined position.

11. The assembly as set forth in claim 10, wherein the controller is programmed to maintain the second airbag in an uninflated position in response to detection of a vehicle impact when the seatback is in an upright position.

12. The assembly as set forth in claim 9, further comprising a second airbag supported by the seat bottom, the controller being programmed to inflate the second airbag in response to detection of a vehicle impact when the seatback is in a reclined position and a rearward-facing position.

13. The assembly as set forth in claim 12, wherein the controller is programmed to move the housing of the airbag assembly to an upward position along the longitudinal axis of the seatback when the seatback is in a reclined position and to move the housing of the airbag assembly to a downward position along the longitudinal axis of the seatback when the seatback is in an upright position.

14. The assembly as set forth in claim 4, further comprising:
   a motor mounted to the seatback:
   a lead screw operatively engaged with the motor; and
   a carriage fixed to the housing of the airbag assembly and operatively engaged with the lead screw;
   the controller being programmed to instruct the motor to move the housing of the airbag assembly along the longitudinal axis of the seatback based on the recline position of the seatback relative to the seat bottom.

15. The assembly of claim 1, wherein the seat bottom and seatback are in a vehicle-rearward facing position.

16. The assembly as set forth in claim 1, wherein the seatback has two bolsters spaced from each other in a cross-seat direction and an occupant seating surface extending from one of the bolsters to the other of the bolsters, the airbag assembly being disposed in one of the bolsters.

* * * * *